United States Patent [19]
Xylander

[11] 3,920,530
[45] Nov. 18, 1975

[54] FLOTATION PROCESS
[76] Inventor: Kurt Xylander, Goethestrasse 9, D-6234 Hattersheim, Germany
[22] Filed: July 10, 1974
[21] Appl. No.: 487,193

[30] Foreign Application Priority Data
June 24, 1974 Germany............................ 2430244

[52] U.S. Cl. ................. 204/152; 204/149; 210/44
[51] Int. Cl.².... C02C 5/12; C02C 1/26; C02B 1/82; C02B 1/10
[58] Field of Search ...... 204/149, 202, 152; 210/44, 210/221, 192

[56] References Cited
UNITED STATES PATENTS
| | | | |
|---|---|---|---|
| 179,658 | 7/1876 | Keith | 204/202 X |
| 689,674 | 12/1901 | Irwin | 204/202 |
| 1,750,177 | 3/1930 | Klein | 204/300 X |
| 2,500,878 | 3/1950 | Sieling | 204/180 R |
| 2,944,952 | 7/1960 | McMinn, Jr. | 204/186 X |
| 3,479,281 | 11/1969 | Kikindai et al. | 210/44 |
| 3,817,865 | 6/1974 | Austin | 204/149 X |

Primary Examiner—John H. Mack
Assistant Examiner—A. C. Prescott

[57] ABSTRACT

In a process for purifying an aqueous liquid by flotation of suspended solids with gas bubbles produced by electrolysis between at least one pair of electrodes, at least one of said electrodes, preferably in the form of an endless belt or band, is transported in or through said liquid while said electrolysis and flotation are taking place. Bridging and fouling of the electrodes are thereby minimised.

23 Claims, 9 Drawing Figures

FLOTATION PROCESS

The invention relates to a process for cleaning waste waters or similar liquids by flotation with gas bubbles produced electrolytically on at least one pair of electrodes as well as to apparatus for performing this process.

Hitherto in such cleaning - flotation processes an electrical voltage was applied to fixed electrodes located in the liquid, resulting in the ions in the liquid migrating to the electrodes of opposite polarity to their charge, and there forming small gas bubbles either directly or by means of chemical reactions.

The quantity of gas bubbles can be varied in simple manner by means of the applied voltage, whereby by increasing the voltage the number of gas bubbles increases and by reducing the voltage the quantity of gas bubbles decreases.

In addition to those ions which form gases after neutralisation of their electrical charge also migrate, ions also migrate which form solid insoluble substances on neutralization of their charge also migrate in the electrical field. In addition, charged colloidal and coarsely dispersed particles also migrate in the electrical field.

All three ions forming insoluble substances as well as the colloidal and coarsely dispersed particles are deposited on the electrodes and form a more or less thick coating.

In many cases there are deposits only on the cathode.

Initially the deposits scarcely impair the conductivity between the electrodes. It is only with an increased coating thickness on the electrodes that an insulating action occurs. The deposits are rough and porous and in part hydrophobic. Therefore the gas formed adheres more strongly to the electrode. Fine gas bubbles can no longer form. Instead the gas only becomes detached from the electrode when it has previously formed into much larger gas bubbles. Gas bubbles with increasingly large dimensions are however unsuitable for performing the flotation process.

In addition the deposits have a highly deleterious action on the durability of the relatively costly electrodes and considerably decrease their life. Marked problems arise when the deposits form bridges between the anode and cathode, which can easily take place because the distances between cathode and anode must be kept as small as possible so that the power costs are as low as possible.

Deposits which are not removed from the electrodes lead to considerable difficulties, or even to the complete failure of the flotation process, and finally, to the destruction of the electrodes.

Hitherto, in order to remove the deposits, the electrodes had to be disassembled after draining off the fluid, and cleaned in costly manner by means of chemical and/or mechanical agents, together with the flotation tank. Depending on the degree of contamination and the size of each electrode, this work can take several hours and must be repeated at fairly short intervals. During this time the flotation plant is inoperative.

It is among the objects of the invention to considerably reduce the deposits on electrodes which tend to form, particularly when treating waste waters; to substantially avoid formation of deposits bridging between anode and cathode; and to also provide the possibility of controllably removing residual deposits without stopping or disturbing the flotation process.

One aspect of my invention provides a process for purifying an aqueous liquid by flotation of suspended solids with gas bubbles produced by electrolysis between at least one pair of electrodes wherein at least one of said electrodes is transported in or through said liquid while said electrolysis and flotation are taking place.

Research and tests performed over a long period have shown that bridge formation can be completely prevented and deposits considerably reduced if, during flotation, the anode and cathode positions are changed relative to one another.

It is in fact known in chemical electrolytic processes to prevent bridge formation and deposits on the electrode by using strippers or the like which are moved between the electrodes. To this end in one known instance wiper arms are used which rotate between the electrodes and come into contact with opposing electrodes. All the wiper arms provided in the electrolytic tank are driven by an electric motor via a continuous chain. The arrangement of the wiper arms is such that, as far as possible, the liquid flow between the electrodes is inhibited only slightly (U.S. Pat. No. 1,186,106).

In another instance, scrapers or strippers are provided, which are passed between opposing electrodes. The mechanical drive for these strippers can be constructed in such a way that two opposed groups of electrodes are treated simultaneously, where the strippers in one group move upwards and the stippers in the other group downwards (U.S. Pat. No. 1,478,714).

However, such electrode cleaning devices are not only extremely costly but, as a result of the electrolytically produced gas bubbles, cannot be used in flotation processes.

The known electrode cleaning devices function partly above the bottom edges of the electrodes, i.e. in the zone where small gas bubbles and gas bubbles charged with material rise in the liquid. Therefore the floating of these particles is considerably impeded. If these particles do not have a clearly defined form but instead have an amorphous structure like most solids contained in waste waters, in addition the parts of the cleaning unit located in this flotation zone are also made dirty. When attempting to clean the electrodes this dirt is smeared onto the electrodes. If parts of the electrode cleaning device project above the water surface and through the floating slime layer, a complete removal of the floating substances from the liquid surface is no longer possible in simple manner. In addition, when operating such cleaning devices a movement would occur in the liquid and slime layer so that a considerable advantage of electrolytic flotation, namely maintaining the flake agglomerations without too great a turbulence in the liquid, would be eliminated.

In one embodiment of the invention the electrodes, i.e. the anode or cathode are transported at different speeds and/or different time intervals through the liquid.

For example, one of the electrodes, usually the anode, can be stationary whilst the second electrode is continuously or intermittently passed through or in the liquid. The electrodes can also be transported in different directions.

Our process may be performed in apparatus comprising a tank having liquid inlet and outlet means, at least one pair of electrodes, and means for causing at least one of said electrodes to enter a liquid in said tank from the surface thereof, to be transported therein in a generally horizontal direction, and to leave said liquid through the surface thereof.

An advantageous apparatus for performing the process has a guide by means of which the cathode and/or anode is introduced in an inclined to vertical direction, for example into the liquid, is deflected into an approximately horizontal transporting direction on reaching the depth provided for flotation and thus passed through the liquid, and subsequently deflected upwards and removed from the liquid in an inclined to vertical direction, for example.

Advantageously the electrode which tends to be contaminated most can be constructed as the transportable electrode, and the other electrode which tends less or not at all towards contamination can be arranged in the flotation tank as the stationary electrode. The particular construction which is selected depends on the liquid or slime to be treated.

The movable electrodes chosen are those which, at various points where joints or flexible connections are provided, are movable in one or more planes in flexible, curvable or bendable manner.

In those cases where it is particularly important during flotation to have extremely precise and small electrode spacings, the electrodes i.e. cathode and anode are transported synchronously. According to a preferred embodiment of the invention, the electrodes form a common transporting unit.

The movable electrodes can in one embodiment be constructed in such a way that at least one electrode i.e. cathode or anode comprises flexibly interconnected rigid electrode sections. In another embodiment the electrodes sections can also be formed by synchronously transported electrodes of opposite polarity within the common transporting units.

Advantageously each rigid electrode section comprises an electrode holder and electrode bars fixed thereto in operative connection with a conveyor means (e.g. a chain) for all electrode sections having the same polarity.

According to another embodiment at least one of the electrodes i.e. the cathode or anode is constructed so as to be at least partially flexible. In this case each electrode can comprise an electrically conductive conveyor belt and electrode bars fixed thereto.

Both in the embodiment with conductive conveyor belts and in the embodiment with rigid electrode sections the electrode rods or electrodes with opposite polarity may project towards one another and be disposed in parallel relation, alternating in the same or different planes. The distances between the individual electrodes must on the one hand be sufficiently large to permit the passage of the gas bubbles optimally with the flotation product and on the other hand, however, sufficiently small that a low electrical voltage can be used. The electrode can be disposed in such a way that either electrodes with opposite polarity are arranged in one plane beside one another or that the positive or negative electrodes are located in different planes and are staggered relative to one another.

To maintain the necessary spacings between the electrodes, the free ends of the electrode bars of one polarity and the root or base ends of the electrode bars of opposite polarity may be interconnected by spacers.

The guidance of the electrodes through the liquid or slime takes place with the voltage applied i.e. when flotation is taking place. The electrodes are kept at the necessary depth for flotation within the flotation tank by guides. Advantageously the guides are simultaneously operative as current supply means.

According to one embodiment the electrodes are also passed through a cleaning apparatus, providing the possibility of controllably removing any residual deposits from the electrodes outside the liquid, whereby the flotation process is not impeded. As compared with flotation apparatuses which do not permit cleaning, the constant cleaning of the electrodes means that they can be made relatively small because flotation is not disturbed by deposits or the like.

A very advantageous feature is to arrange baffles which project into the flotation tank to form inlet or outlet ducts for the electrodes. As a result the electrodes entering or leaving the flotation tank are not passed through the flotated material, which could make them dirty.

The anode and/or cathode can be constructed as an endless belt. They can also comprise connectable portions. Cleaning can either be performed manually or automatically, for example by rotating brushes or by baths which contain a cleaning solution. If the anode or cathode comprises connectable portions, such a portion on removal from the flotation tank can be disconnected from the electrode portions still located in the flotation tank, cleaned, and then on the feed or entry side can be connected again to the electrode to be inserted into the flotation tank.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

Illustrative embodiments of the invention will now be described by way of example with reference to the accompanying schematic drawings wherein.

Figure 2:
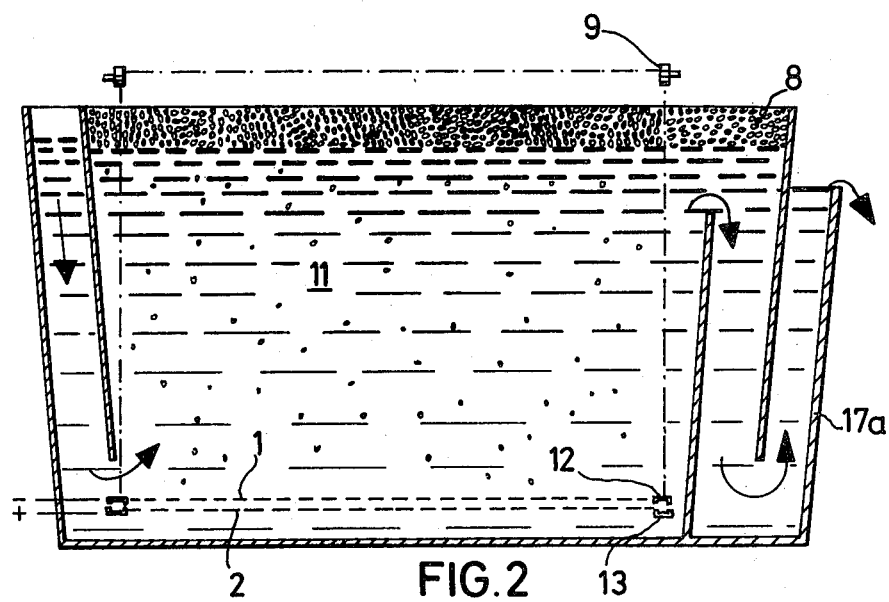
FIG. 2 is a cross-section through the flotation tank of FIG. 1 at right angles to the direction of electrode movement.
Figure 1:
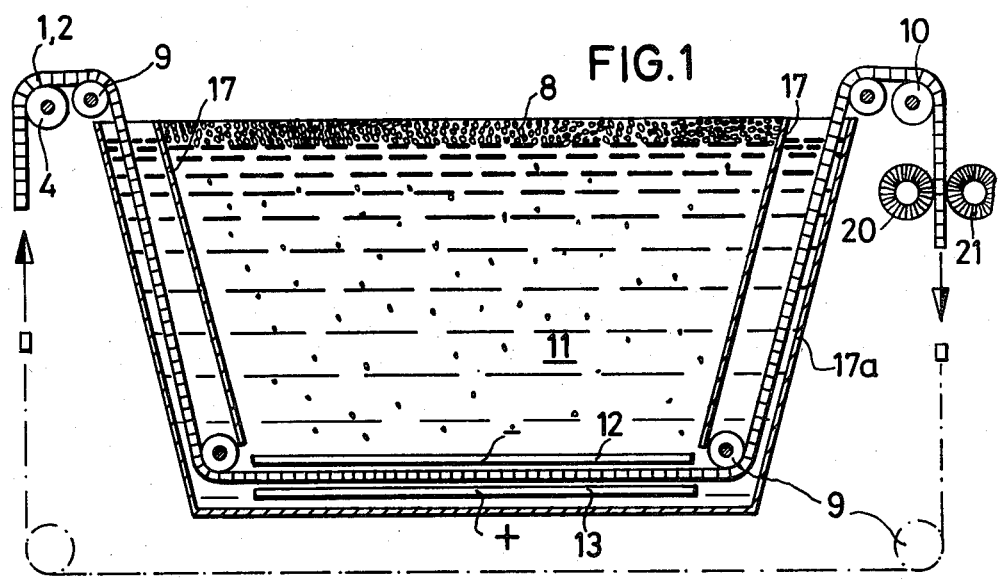
FIG. 1 is a cross-section through a flotation tank taken in the direction of electrode movement.

Referring now to FIGS. 1 and 2, a flotation tank 17a, represented schematically, is constructed in a conventional manner. The schematically indicated electrodes, namely cathode 1 and anode 2, which are described in greater detail hereinafter are constructed in the form of a belt or continuous belt. The electrodes 1, 2 pass over guide rollers 9, a driving roller 10 and a roller 4 arranged as a tensioning roller. In FIG. 1 the continuous belt is guided along the outside of the flotation tank 17a underneath the base thereof. In another embodiment of the invention the continuous electrode belt can also be guided back above the flotation tank.

If the electrodes 1 and 2 are constructed as a continuous belt they can be automatically cleaned outside the flotation tank either manually or automatically for example by rotating brushes 20, 21. If the electrodes are not constructed as an endless belt the cleaning can take place in the same way. If the electrodes comprise a belt of hingedly interconnected rigid electrode sections, as will be explained in detail hereinafter, the electrode portions leaving the slime 11 can be disconnected after cleaning and then connected to the electrode belt again on the feed side. This is possible without difficulty because the transporting speed does not normally exceed 100 cm per hour if the electrodes are transported continuously through the liquid 11. The connecting or disconnecting of electrode portions is even less critical if flotation takes place in each case with the electrodes stationary until a pre-determined time has passed. The electrodes are then moved through the flotation tank 17a until all the electrode portions which are dirty are located outside the liquid 11. The cleaning then takes place with the electrodes stationary, as does the disconnecting and the connecting of the cleaned electrode portions. In order to ensure that the electrodes 1, 2 on entry into the liquid 11 or on removal therefrom do not become dirty as a result of the flotation product 8 on the surface of the liquid 11, baffles 17 projecting into the liquid 11 are provided, by means of which ducts are formed within the flotation tank 17a which are free from flotation product 8. The flotation product 8 is removed from the liquid surface in a manner per se known.

In the lower area of flotation tank 17a guides 12 and 13 are provided by means of which the electrodes 1,2 are kept at the depth necessary for flotation. The guides 12, 13 simultaneously serve as bus-bars.

The direction of movement of electrodes 1,2 is indicated by the arrows in FIG. 1.

In cross section through the flotation tank 17a according to FIG. 2, the water supply and discharge arrangements are shown. The water flows into the flotation tank 17a at a small distance above the electrodes 1,2 and above the latter reaches an overflow which is located at a considerable distance above electrodes 1,2. This arrangement for supply and/or discharge of the slime or water 11 is known per se.

According to one embodiment of the invention the driving roller 10 can be driven manually and in another embodiment can be driven in controllable manner by an electric motor.

It is important to ensure that the electrodes are guided in or through the liquid 11 whereby they maintain their position in the liquid relative to the liquid surface. FIG. 1 shows that this takes place by means of the guides 12, 13. As the power supply takes place by means of guides 12, 13 the portions of electrodes 1,2 located outside the flotation tank 17a are substantially de-energised.

FIGS. 1 and 2 show that it is possible with simple means to transport the electrodes 1,2 at different speeds and/or at different time intervals through the liquid. It is equally easy to transport the electrodes 1,2 in different directions through the liquid. In the embodiment represented in FIG. 1 a guide is preferred by means of which the electrodes are introduced into liquid 11 in an inclined to vertical direction whereby on reaching the depth intended for flotation they are guided by means of guides 12, 13 in an approximately horizonal transporting direction through the liquid and subsequently, for example by means of a guide roller 9, are trained upwards and emerge from the liquid in an inclined (to the vertical) transporting direction. Parts of the electrode can maintain their position relative to the liquid surface, for example like the members of an escalator. However it is also possible with the apparatus schematically represented in FIGS. 1 and 2 for the electrodes to change their position relative to the surface of the liquid 11 on changing the transporting direction.

Figure 3:
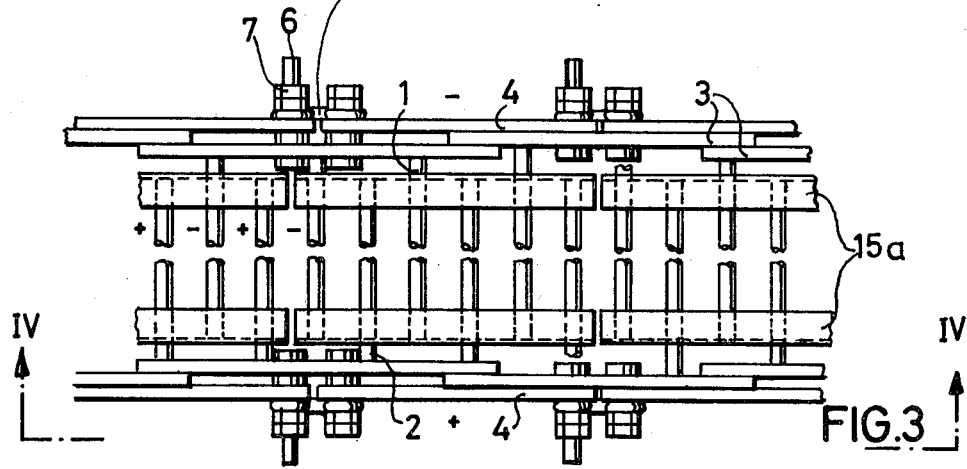
FIG. 3 is a plan view of a first electrode assembly suitable for use in the process of the invention.

FIG. 3 shows a plan view of a first electrode assembly wherein the electrodes, namely cathodes 1 and anodes 2 are transported synchronously. In addition they form a common transporting unit.

Figure 4:
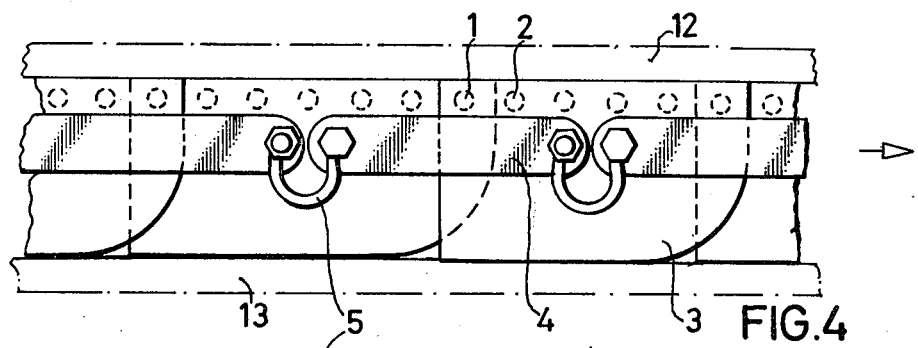
FIG. 4 shows the arrangement according to FIG. 3 in the direction of the line IV—IV in FIG. 3 on an enlarged scale.

At least one of the electrodes i.e. the cathode or anode, comprises hingedly interconnected rigid electrode sections. Each rigid electrode section comprises an electrode holder 3 and electrode bars 1 or 2 fixed thereto; the sections are in operative connection to form a conveyor chain 3,4,6,7 of all electrode sections with the same polarity. FIGS 3 and 4 show that a conveyor chain comprises electrode holders 3 and fish plates 4. The hinged connection between the fish plates 4 and electrode holders 3 is effected by tie bolts 7 to which are pivoted conveying dogs 6. The conveying dogs 6 cooperate with a driving sprocket (not shown) in per se known manner.

According to FIGS. 3 and 4 electrode bars 1 or 2 of the same polarity are connected with electrode holders 3 of a conveying chain 3 and 4. For example in the lower part of FIG. 3 are shown the electrode bars 2 for the anode and in the upper part of FIG. 3 the electrode bars 1 for the cathode. As shown in FIG. 4, the ends of adjacent pairs of fish plates are electrically interconnected by current bridges or straps 5. FIG. 4 shows the guides 12 and 13 between which the electrode holders of FIG. 3 slide inside the liquid 11.

FIG. 3 shows that the positive and negative electrode bars 12 follow one another alternately. The cathode electrode bars 1 are fixed to the electrode holders 3 in the upper portion of FIG. 3 whilst the anode electrode bars 2 are fixed to the electrode holders 3 shown in the lower portion of FIG. 3.

As shown in FIG. 3 insulating strips 15a are provided by means of which the free ends of the electrode bars 1, 2 of one polarity and the roots or base ends of the electrode bars 2, 1 of the other polarity are spacedly interconnected. The spacers or insulating strips 15a are divided between electrode sections in order to permit passage of the electrodes around the guide rollers 9 of FIG. 1.

The connection between the electrode holders 3 and the fish plates 4 can be such that the connecting member 7 can be easily connected or disconnected. This facilitates cleaning or interchanging of the electrodes if they are damaged or made unusable.

Figure 6:
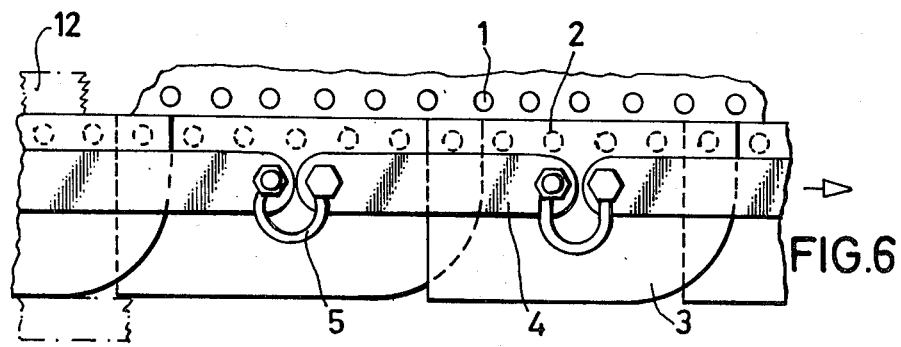
FIG. 6 is a side view of the arrangement according to FIG. 5.
Figure 5:
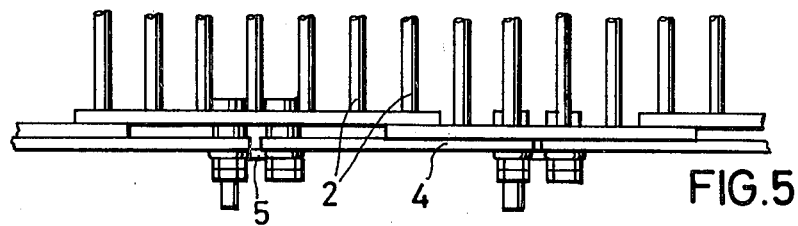
FIG. 5 is a partial plane view of a second electrode assembly suitable for use in the process of the invention.

FIG. 5 shows a plan view of a second type of electrode assembly. In conjunction with the side view according to FIG. 6 it can be seen that an electrode holder is provided with adjacent electrode bars 2 having the same polarity. The electrode bars 1 of the cathode are arranged above the electrode holder 3 (FIG. 6). These bars can be provided in or mounted on the guide 12. In the embodiment according to FIG. 6 the electrode bars 1 are stationary and below the said electrode bars 1 the electrode bars 2 are moved by the electrode holders 3 in the direction of the arrow.

Figure 9:
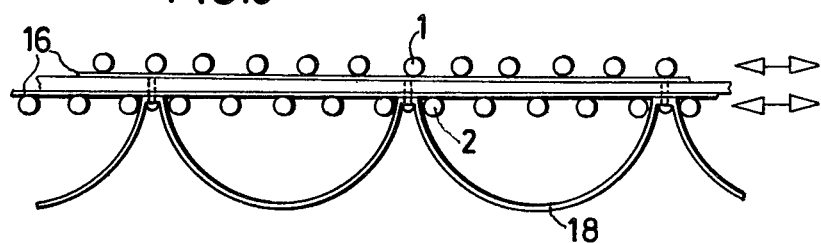
FIG. 9 is a side view of a modified assembly according to FIG. 7.
Figure 8:
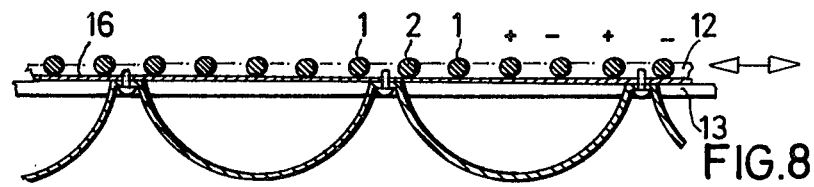
FIG. 8 is a side view of the arrangement according to FIG. 7.
Figure 7:
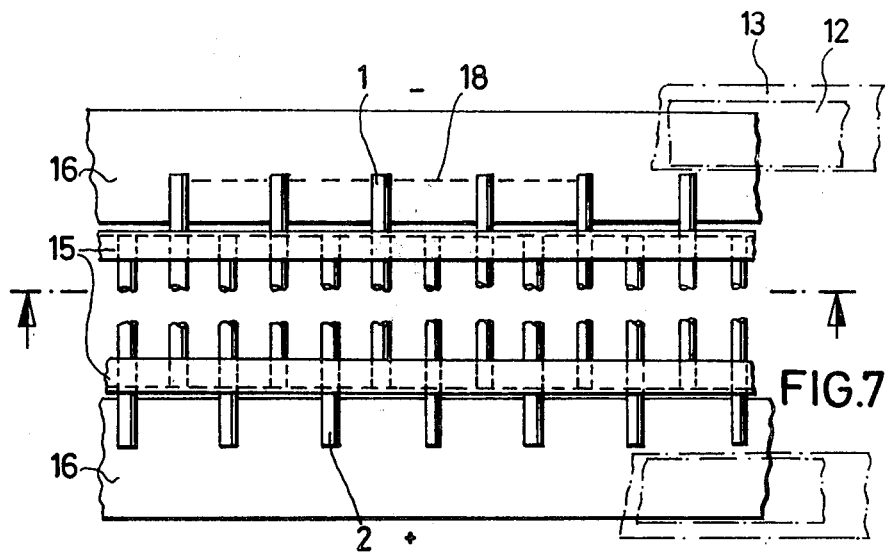
FIG. 7 is a plan view of a third operable electrode assembly.

FIG. 7 shows in plan view a third type of electrode assembly. The electrodes comprise flexible metallic or electrically conductive belts 16 and electrode bars 1 or 2 which are fixed thereto. On the right hand side of FIG. 7 are shown the guides 12 and 13 between which the belts 16 are guided. As indicated in the previous part of the description, guides 12 and 13 also furnish a power supply to the conductive belts 16. Opposing belts 16 each bear electrode bars 1 or 2 of the same polarity which project towards one another in the assembly; bars of different polarity alternate. The electrodes of FIGS. 7 and 8 and 9 are at least partially flexible. In all the embodiments of FIGS. 3 to 9 the electrode bars 1, 2 can project towards one another and can be alternately juxtaposed in the same or different planes.

The arrows in FIGS. 8 and 9 indicate the transporting direction of the electrodes. According to FIG. 9 for example the negative electrode bars 1 can be fixed or movable. Below the movable electrode bars it is possible to provide collecting vessels 18 for sediment. Whereas in the embodiment according to FIG. 8 in each case positive or negative electrode bars 1 and 2 are moved together synchronously or in the form of a transporting unit, in the embodiment according to FIG. 9 there is either the movement of the positive or negative electrode bars, or even an opposite movement of the positive and negative electrode bars.

FIG. 7 shows that in this embodiment once again spacers or insulating strips 15 are provided by means of which the free ends of the electrode bars 1, 2 of one polarity and the roots of bars 2,1 with the other polarity are kept spaced from one another.

Comparative tests were carried out with flotation tanks in which the electrodes were fixed and with tanks in which the electrodes were transported through the liquid in accordance with the invention. In this connection both canal and industrial waste waters were used from which colloidally dispersed constituents were previously absorbed on precipitated aluminium or iron hydroxide.

In the flotation tests with fixed electrodes there is on average an interruption of flotation of 11 sec/m$^3$ of liquid subjected to flotation, and the electrodes had to be replaced after treating 3,600 m$^3$/m$^2$ of electrode surface.

The flotation according to the invention was performed continuously without any interruption and the electrodes revealed no signs of wear after treating 5,000 m$^3$/m$^2$.

Normally electrodes made from a durable material, for example high grade steel or platinised titanium or the like, are used in electrolytic flotation processes. Metal salts, usually iron or aluminium salts, are added to the water when using the flotation for water purification purposes. Subsequently the corresponding hydroxide is precipitated so that the materials contained in the water or waste water are brought into a form which can be separated from the water. The hydroxide flakes formed are then separated from the water by flotation with the absorbed pollutent. It is disadvantageous that the salt content of the water is increased by adding the metal salts.

However a water purification process is also known wherein the hydroxide flakes are produced from iron and/or aluminium electrodes. In this process the iron or aluminium electrodes slowly dissolve over a period of time with voltage applied. In addition the electrodes become coated so that they produce increasingly less effective hydroxide.

The process of the invention now makes it possible to continuously observe the iron or aluminium electrodes or the state thereof. If, in the apparatus according to the invention, electrodes are used which are made wholly or partly of iron and/or aluminium, it is possible to simultaneously purify and subject to flotation waste waters, without adding iron or aluminium salts to the water. The state or condition of the electrodes can then be checked without interrupting the chemical process or the flotation.

If in addition to suspended substances the liquids contain solids which cannot be subjected to flotation, or this can only be done with great difficulty, sediments are obtained which must be separated from the liquid. This occurs for example with selective ore flotation.

In one embodiment the sediment is separated from the liquid into collecting vessels 18 for the sediment fixed underneath the movable electrodes. Therefore by use of the invention the sedimented substances are easily removed from the liquid. The material of the vessels can be rigid or flexible, electrically conductive or electrically insulating. Electrically conductive vessels can be connected to the electrodes in insulating manner.

The electrode arrangements shown in the drawings are only embodiments. It is within the scope of the invention for example to use differently shaped bars instead of the round electrode bars represented herein.

In certain applications it is advantageous to use gauze fabric, perforated plates or perforated metal sheets as electrodes, or it is possible to use inclined or perpendicular electrode plates.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:

1. A process for purifying an aqueous liquid which includes the step of producing bubbles by electrolysis between at least one pair of electrodes for flotation of suspended solids by said bubbles produced by said electrolysis wherein the improvement comprises the step of moving at least one of said electrodes within said liquid while said electrolysis and flotation are occurring.

2. The process according to claim 1 wherein said step of moving comprises moving both electrodes of said pair at the same speed through said liquid.

3. The process according to claim 1 wherein said step of moving comprises lowering said at least one electrode from above the surface of said liquid to below said surface, transporting said at least one electrode generally horizontally through said liquid, and raising said at least one electrode above said surface.

4. The process according to claim 1 wherein said step of moving comprises moving successive pairs of said electrodes into said liquid, energizing said pairs of electrodes after they are submerged in said liquid and while they are transported a predetermined distance within said liquid, deenergizing said pairs of electrodes after they have been transported said predetermined distance, and removing said pairs of electrodes from said liquid after they have been de-energized.

5. The process of claim 1 wherein said step of moving comprises moving successive electrodes which are interconnected to form an endless belt into, through and out of said liquid.

6. The process according to claim 1 wherein said step of moving comprises moving successive electrodes continuously into, through and out of said liquid.

7. The process according to claim 1 wherein said step of moving comprises moving a first group of electrodes into said liquid, stopping the movement of said electrodes, and then moving said first group of electrodes out of said liquid while moving a second group of electrodes into said liquid.

8. The process according to claim 1 which includes moving a sediment-collecting tray through said liquid below the path in said liquid of said at least one electrode.

9. The process according to claim 1 which includes moving a sedimentcollecting tray through said liquid at the same speed at which said at least one electrode is moved through said liquid.

10. The process of claim 1 wherein said step of moving comprises lowering at least one pair of electrodes from above the surface of said liquid to below said surface, transporting said pair of electrodes generally horizontally through said liquid, and raising said pair of electrodes above said surface.

11. The process according to claim 1 which includes the step of moving said at least one of said electrodes into and out of contact with power supply means submerged in said liquid to selectively energize and deenergize said at least one electrode.

12. The process according to claim 1 wherein said step of moving comprises moving said at least one electrode substantially horizontally through said liquid adjacent the bottom of the container of said liquid.

13. The process according to claim 1 wherein said step of moving comprises moving said at least one electrode through said liquid at a speed between 10 and 200 centimers per hour.

14. The process of claim 3 wherein said steps of lowering and raising said at least one electrode comprise moving said at least one electrode through a passageway isolated from portions of said liquid above where said at least one electrode is transported generally horizontally.

15. The process according to claim 3 wherein said step of lowering comprises moving said at least one electrode down into said liquid along a path inclined from the vertical.

16. The process according to claim 3 wherein said step of raising comprises moving said at least one electrode upwardly through said liquid along a path inclined from the vertical.

17. The process according to claim 5 which comprises moving said successive electrodes to a cleaning station situated outside said liquid.

18. The process according to claim 5 which includes roller-guiding said endless belt of successive electrodes within said liquid.

19. The process according to claim 5 which includes temporarily disconnecting, removing, cleaning and reconnecting sections of said endless belt of electrodes after they have emerged from said liquid and before they re-enter the liquid.

20. The process according to claim 5 which includes scrubbing electrode portions of said endless belt of electrodes after they have emerged from said liquid and before they re-enter said liquid.

21. The process according to claim 10 wherein said step of transporting comprises transporting pairs of electrodes of opposite polarity generally horizontally in the same plane.

22. The process according to claim 10 wherein said step of transporting comprises transporting pairs of electrodes of opposite polarity generally horizontally in first and second respective generally-horizontal, vertically-separated planes.

23. The process according to claim 10 which includes moving one electrode of said pair in a first generally horizontal direction through said liquid and moving the other electrode of said pair in a second generally horizontal direction through said liquid, said first direction being opposite to said second direction.

* * * * *